United States Patent
Corwin et al.

(10) Patent No.: US 10,919,351 B1
(45) Date of Patent: Feb. 16, 2021

(54) LOADING BRACKET FOR COMPOSITE STRUCTURAL COMPONENTS

(71) Applicant: Shape Corp., Grand Haven, MI (US)

(72) Inventors: Cort C. Corwin, Grand Haven, MI (US); Kannan Ramamoorthy, Holland, MI (US)

(73) Assignee: Shape Corp., Grand Haven, MI (US)

( * ) Notice: Subject to any disclaimer, the term of this patent is extended or adjusted under 35 U.S.C. 154(b) by 197 days.

(21) Appl. No.: 16/267,931

(22) Filed: Feb. 5, 2019

Related U.S. Application Data

(63) Continuation of application No. 16/240,299, filed on Jan. 4, 2019, now abandoned.

(60) Provisional application No. 62/613,620, filed on Jan. 4, 2018.

(51) Int. Cl.
| | |
|---|---|
| *B60D 1/56* | (2006.01) |
| *B60D 1/145* | (2006.01) |
| *B60R 19/24* | (2006.01) |
| *B60D 1/48* | (2006.01) |
| *B60R 11/00* | (2006.01) |

(52) U.S. Cl.
CPC ............. *B60D 1/56* (2013.01); *B60D 1/145* (2013.01); *B60D 1/485* (2013.01); *B60R 19/24* (2013.01); *B60R 2011/005* (2013.01)

(58) Field of Classification Search
CPC .......... B60D 1/56; B60D 1/145; B60D 1/485; B60R 19/24; B60R 2011/005
USPC ..................... 293/133, 132, 117, 154, 155
See application file for complete search history.

(56) References Cited

U.S. PATENT DOCUMENTS

| | | | |
|---|---|---|---|
| 8,419,040 B2 | 4/2013 | Ando | |
| 8,550,498 B2 | 10/2013 | Klimek | |
| 8,820,804 B2* | 9/2014 | Shibata | B60D 1/56 |
| | | | 293/117 |
| 9,669,785 B2 | 6/2017 | Holmstrom | |
| 10,065,468 B2* | 9/2018 | Virupaksha | B60R 19/023 |
| 2004/0207217 A1* | 10/2004 | Muller | B60D 1/488 |
| | | | 293/133 |
| 2008/0001383 A1* | 1/2008 | Hodoya | B60D 1/565 |
| | | | 280/477 |
| 2009/0278333 A1* | 11/2009 | Lopez | B60D 1/52 |
| | | | 280/495 |
| 2015/0298633 A1 | 10/2015 | Winberg | |

FOREIGN PATENT DOCUMENTS

JP 2018043673 A * 3/2018 ............. B60R 19/48

* cited by examiner

*Primary Examiner* — Jason S Morrow
*Assistant Examiner* — E Turner Hicks
(74) *Attorney, Agent, or Firm* — Honigman LLP

(57) ABSTRACT

A loading bracket assembly includes a base bracket having an engagement portion that is disposed at an interior area of a composite vehicle structural component and that is accessible through the first wall. A fastener may be attached to the engagement portion of the base bracket and may extend through an intermediate wall of the composite vehicle structural component and a supportive structure of the vehicle. The engagement portion of the base bracket is configured to engage a component or an accessory, such as a tow hook, that applies a loading force to the base bracket that is substantially transferred to the supportive structure and bypasses the composite vehicle structural component.

20 Claims, 6 Drawing Sheets

LOADING BRACKET FOR COMPOSITE STRUCTURAL COMPONENTS

CROSS-REFERENCE TO RELATED APPLICATION

This application is a continuation application of U.S. patent application Ser. No. 16/240,299, filed Jan. 4, 2019, which claims benefit and priority under 35 U.S.C. § 119(e) of U.S. provisional application Ser. No. 62/613,620, filed Jan. 4, 2018, which are hereby incorporated herein by reference in their entirety.

TECHNICAL FIELD

The present disclosure generally relates to composite beams and frame components, and more particularly, to brackets for such composite beams and components, such as for attaching a vehicle tow or recovery hook, engaging or adjoining structural components of the vehicle frame, or engaging or adjoining modules and accessories, such as sunroof assemblies, window assemblies, tie downs, roof cargo carrier assemblies, and the like.

BACKGROUND

Commonly, vehicle structural components, such as bumper beams and frame components, are made of metal, such as steel or aluminum alloys, so as to provide the necessary structural support and strength for the vehicle frame and associated modules and accessories. In an effort to reduce vehicle weight for improving vehicle performance, some vehicle parts may be produced with plastic and composite materials. However, it can be difficult to provide attachment structures and locations on parts made with such low weight materials, such as for attaching to other structural components or accessories that have high load demands, such as tow or recovery hooks, tie downs, roof cargo carrier assemblies, and the like.

SUMMARY

The present disclosure provides a loading bracket assembly for a composite vehicle structural component, such as a bumper beam, a frame component, or a structural accessory, among other conceivable vehicle components. The loading bracket assembly adapts such a composite structural component to receive loading forces, such as forces applied by a tow hook at a bumper beam, by redirecting the loading forces to a structural support and around or generally away from the composite structural component. The loading bracket assembly also minimizes holes or openings formed in the composite structural component that could jeopardize the performance of the composite structural component, such as by avoiding holes or openings or other interruptions to the tensile surfaces or walls of the composite structural component. The loading bracket assembly may include a base bracket that has an engagement portion disposed within a hollow interior area of a composite beam, where the engagement portion of the base bracket may be accessible through a wall or portion of the composite beam. A fastener or similar force transfer element may be coupled or attached between the base bracket and a supportive structure of the vehicle, such that a loading force that is applied to the base bracket may be transferred to the supportive structure and substantially avoid loading the composite structural component. Accordingly, a loading force applied to the base bracket may be greater than a maximum force that the composite structural component would otherwise be capable of withstanding without the use of such a loading bracket. The composite vehicle structural component may include a beam that comprises a polymeric material, such as a thermosetting polymer, with a high density of generally continuous reinforcements, such as fiber reinforcements extending a length of the beam and being imbedded in strategic locations within the polymeric material, such as a pultruded composite beam.

According to one aspect of the present disclosure, a vehicle structural assembly includes a composite beam that has at least three walls, where a first wall and a third wall of the composite beam extend together along opposing sides of the composite beam over at least a portion of a length of the composite beam to provide a hollow interior area therebetween. A second wall connects between the first and third walls. A base bracket has an engagement portion that partially extends through an opening in the first wall and is partially disposed at the hollow interior area of the composite beam. An interface member is disposed at the second wall of the composite beam and extends over the third wall and away from the composite beam to engage a supportive structure of the vehicle. A fastener extends through the second wall of the composite beam and attaches between the engagement portion of the base bracket and the interface member. The fastener and interface member are together configured to transfer a loading force that is applied to the engagement portion of the base bracket around the third wall of the composite beam to the supportive structure.

According to another aspect of the present disclosure, a loading bracket assembly is provided for a composite vehicle beam that has a hollow interior area defined between an outer wall and an inner wall of the composite vehicle beam. The loading bracket assembly includes a base bracket that has an engagement portion configured to extend through the outer wall and be disposed at the hollow interior area of the composite beam. An interface member is configured to span between a side wall of the composite vehicle beam and a supportive structure of a vehicle. A fastener is attached between the interface member and the engagement portion of the base bracket. The fastener is configured to extend through and compress the side wall of the composite vehicle beam between the interface member and the base bracket. The engagement portion of the base bracket includes an attachment feature that is configured to receive a loading force that is applied to the base bracket. The interface member is configured to transfer the loading force applied to the base bracket around the inner wall of the composite vehicle beam to the supportive structure.

According to another aspect of the present disclosure, a loading bracket assembly is provided for a composite vehicle structural component that has an interior area defined between a first wall and a third wall that are interconnected by a second wall. The loading bracket assembly includes a base bracket that has an engagement portion configured to be disposed at the interior area of the composite vehicle structural component and accessible through the first wall. A fastener is attached to the engagement portion of the base bracket and is configured to extend through the second wall of the composite vehicle structural component and a structural member to attach the base bracket to a supportive structure of the vehicle. The engagement portion is configured to engage a component or an accessory that applies a loading force to the base bracket that is substantially transferred to the supportive structure and bypasses the composite vehicle structural component. Thus, the third wall may be substantially uninterrupted.

According to yet another aspect of the present disclosure, a bumper reinforcement assembly includes a bumper beam that has a tubular portion with a front wall, a rear wall, and at least one hollow interior area disposed between the front and rear walls. The hollow interior area spans longitudinally within the bumper beam. The bumper beam includes a polymeric material and fiber reinforcement imbedded in the polymeric material. The loading bracket has an engagement portion that extends through the front wall and is disposed within at least one of the hollow interior areas of the bumper beam. An interface member is attached at an exterior surface of a sidewall of the bumper beam that connects between the front and rear walls of the bumper beam. A fastener is engaged through the interface member and the engagement portion of the loading bracket to compress the side wall of the bumper beam between the interface member and the loading bracket. The engagement portion of the base bracket includes an attachment feature that is configured to receive a loading force that is applied to the base bracket.

These and other objects, advantages, purposes, and features of the present disclosure will become apparent upon review of the following specification in conjunction with the drawings.

DETAILED DESCRIPTION

Figure 1:
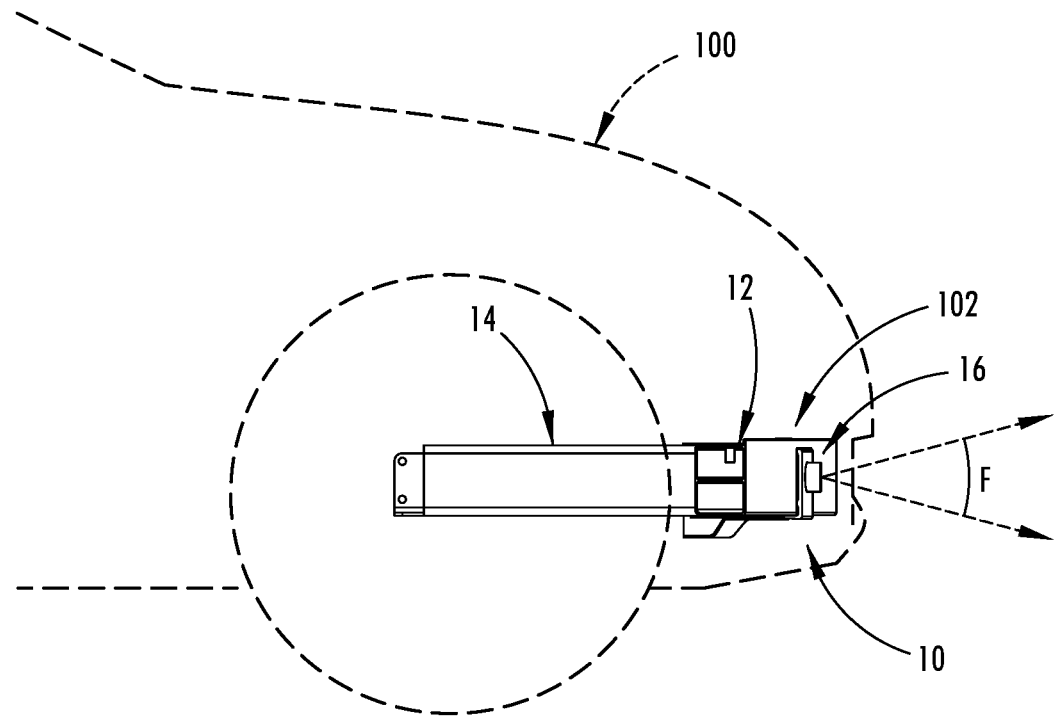
FIG. 1 is a side elevational view of a front portion of a vehicle schematically illustrating a bumper assembly that has a loading bracket for attaching a tow hook.

Referring now to the drawings and the illustrative embodiments depicted therein, a loading bracket assembly 10 is provided for a composite structural component of a vehicle 100, such as the illustrated bumper beam 12. The composite structural component may include a composite beam that comprises a polymeric material, such as a thermosetting polymer, with a high density of generally continuous reinforcements, such as fiber reinforcements extending a length of the beam and being imbedded in strategic locations within the polymeric material, such as a pultruded composite beam. The loading bracket assembly 10 adapts such a composite structural component to receive loading forces, such as forces applied by a tow hook at the bumper beam 12, by redirecting the loading forces to a structural support 14 of the vehicle 100 and away from the composite structural component or beam 12. It is also contemplated that the loading bracket assembly 10 may be configured for use with other composite structural components, such as a frame component, like a roof bow, a roof header, a frame pillar, a rocker rail, and a seat support member, among other conceivable structural vehicle beam components. In addition to the illustrated tow hook application, the loading bracket assembly may be designed to be used to assist with engaging or adjoining other structural components of the vehicle frame and/or other modules and accessories, such as sunroof assemblies, window assemblies, tie downs, roof cargo carrier assemblies, and the like.

Figure 4:
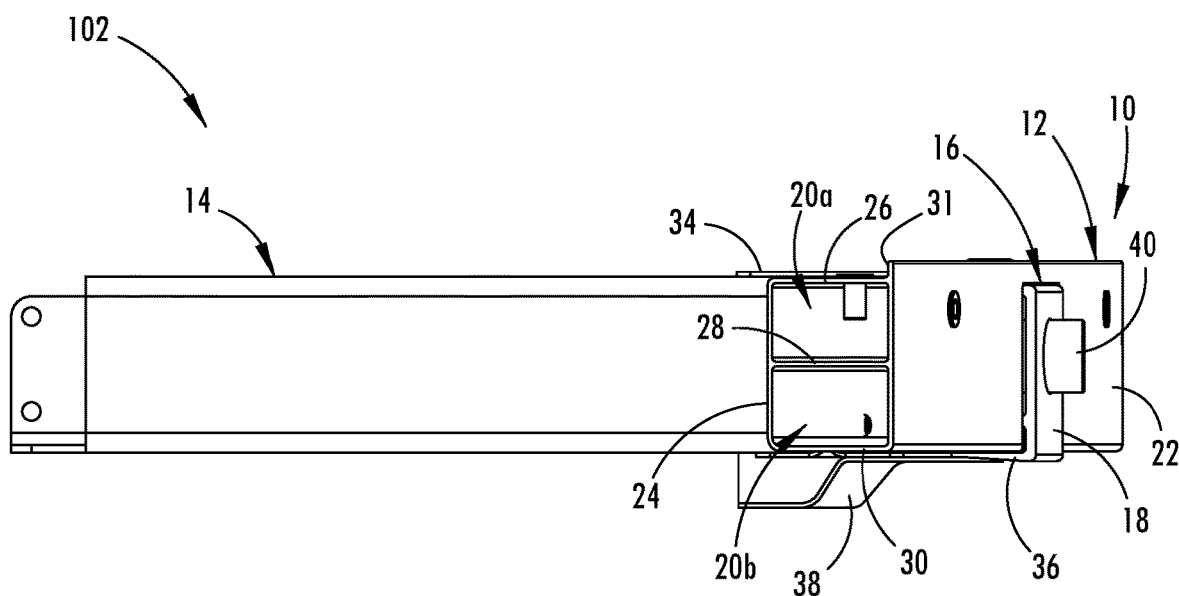
FIG. 4 is a side elevational view of the bumper assembly of FIG. 3.
Figure 5:
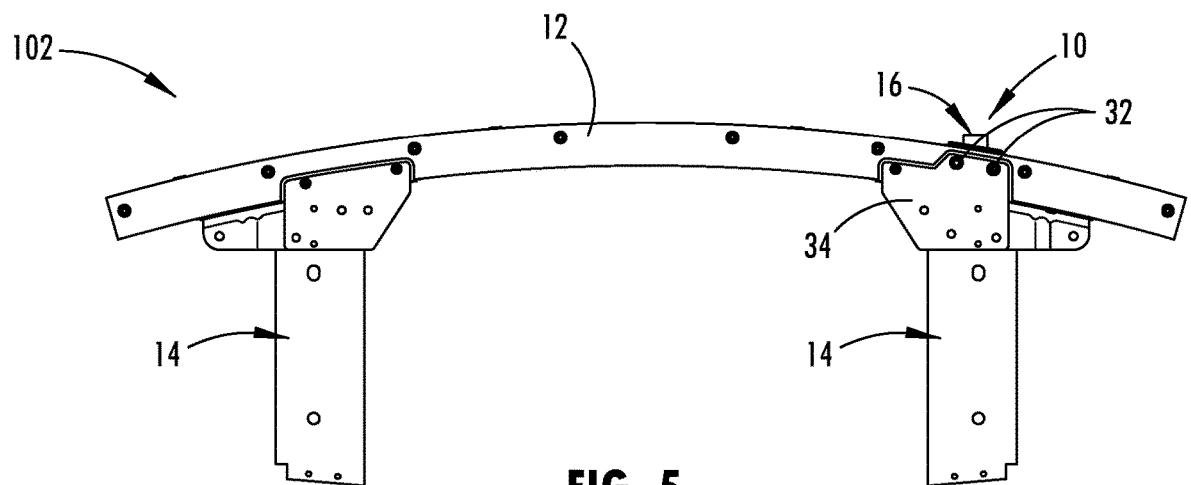
FIG. 5 is an upper plan view of the bumper assembly of FIG. 3.

The loading bracket assembly 10, such as shown in FIGS. 1-11A, may include a base bracket 16 that has an engagement portion 18 disposed at least partially within an interior area 20 of a composite structural component, such as within an enclosed or hollow interior area defined between an outer wall 22 and an inner wall 24 of the composite beam 12 (FIG. 4). The hollow interior area 20 of the bumper beam 12 may extend longitudinally within the beam and may be divided into separate hollow areas 20a, 20b that are formed by adjacent tubular shaped portions of the beam, such as shown in FIG. 4 with the hollow areas 20a, 20b defined between a front wall section 22 of the beam and a rear wall section 24 of the beam, and further defined by upper, lower, and intermediate horizontal wall sections 26, 28, 30. The engagement portion 18 of the base bracket 16 may be accessible through or at a wall or portion of the composite structural component, such as through the front wall section 22 of the composite bumper beam 10 shown in FIG. 4. The engagement portion 18 is configured to engage a component or an accessory that applies a loading force F (FIGS. 1 and 2) to the base bracket 16 that is substantially transferred to the supportive structure 14 and bypasses the composite vehicle structural component 10. The illustrated engagement portion 18 may be accessed to engage a tow hook, such as via threaded engagement of the tow hook. It is also contemplated that the accessory or structural component that may also or alternatively engage the engagement portion with other mechanical attachment configurations, adhesive, fasteners, welding, or related attachment features or combinations of such attachment features.

Figure 11:
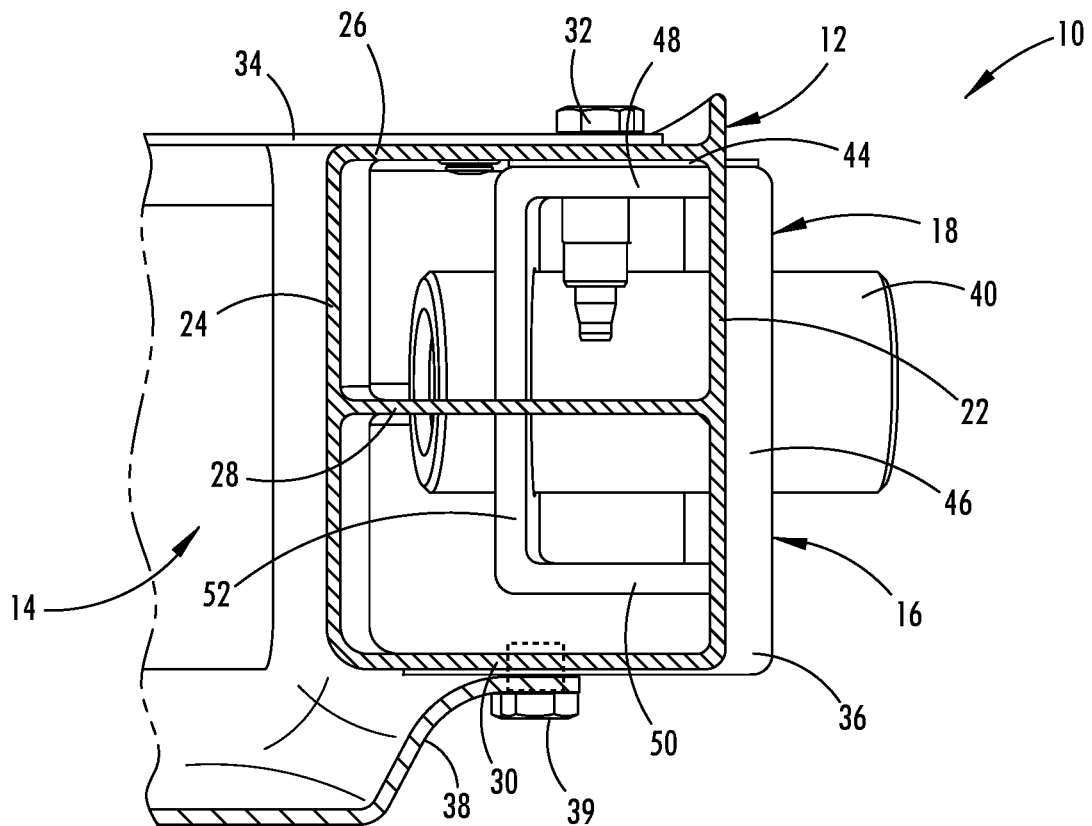
FIG. 11 is a cross-sectional view of the bumper assembly of FIG. 10, showing the bracket assembly attached to the bumper beam.
Figure 11A:
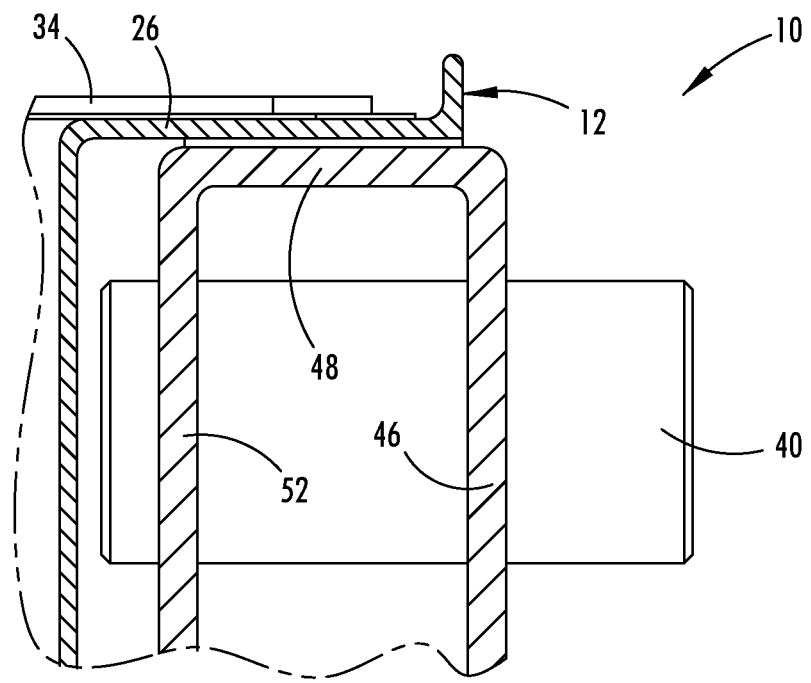
FIG. 11A is a cross-sectional view of an upper portion of the bracket assembly shown in FIG. 11.

As shown in FIG. 11, a fastener 32 or other force transfer element may be coupled or attached between the base bracket 16 and a supportive structure 14 of the vehicle, such that a loading force that is applied to the base bracket (via the tow hook) may be transferred to the supportive structure 14 and substantially avoid the composite structural component 12. The fastener 32 may extend through the intermediate portion or a side wall 26 of the composite vehicle structural component 10 to attach the base bracket 16 to the supportive structure 14 of the vehicle 100. To assist with load transfer to the supportive structure 14, an interface member 34 may span between an exterior surface of the composite structural component 12 and the supportive structure 14 of the vehicle. As shown in FIG. 11, the fastener or fasteners 32 may be attached between the interface member 34 and the engagement portion 18 of the base bracket 16.

The fastener 32 may extend through and compress the side wall 26 of the composite vehicle beam 12 between the interface member 34 and the base bracket 16. The interface member 34 is configured to transfer the loading force applied to the base bracket 16 through the side wall 26 and around the inner wall 24 of the composite vehicle beam to the supportive structure 14.

Figure 6:
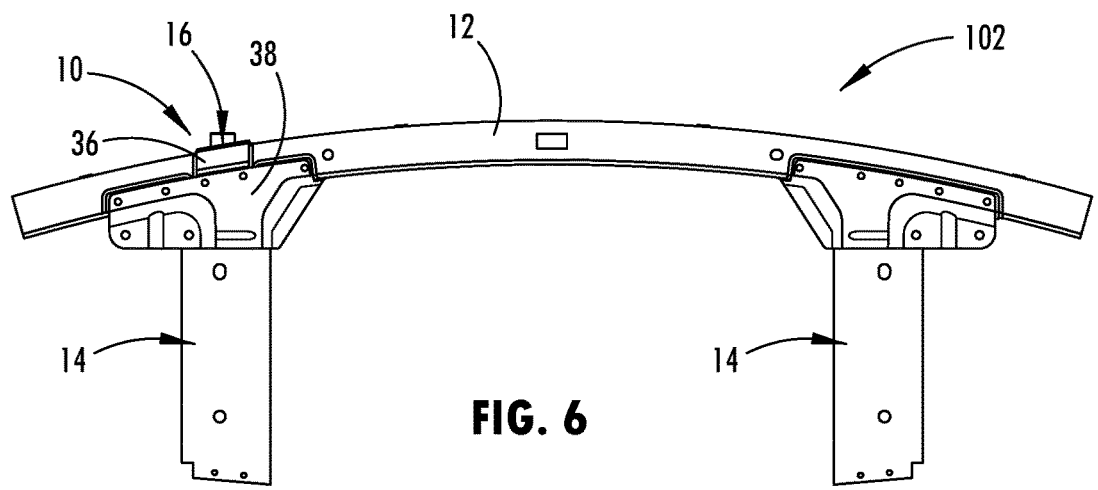
FIG. 6 is a lower plan view of the bumper assembly of FIG. 3.
Figure 7:
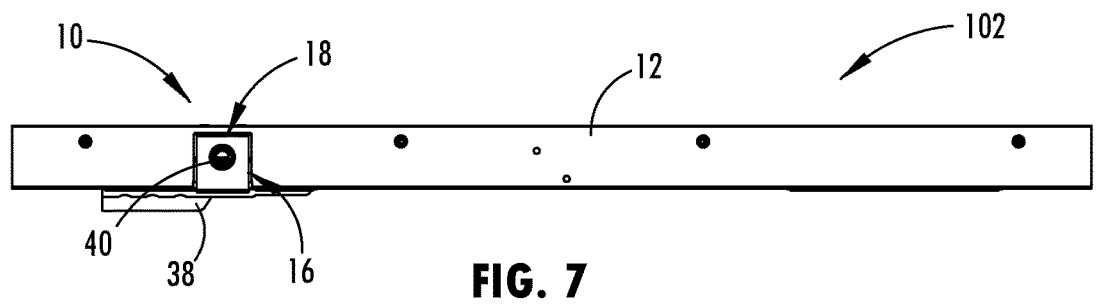
FIG. 7 is a rear elevational view of the bumper assembly of FIG. 3.
Figure 8:
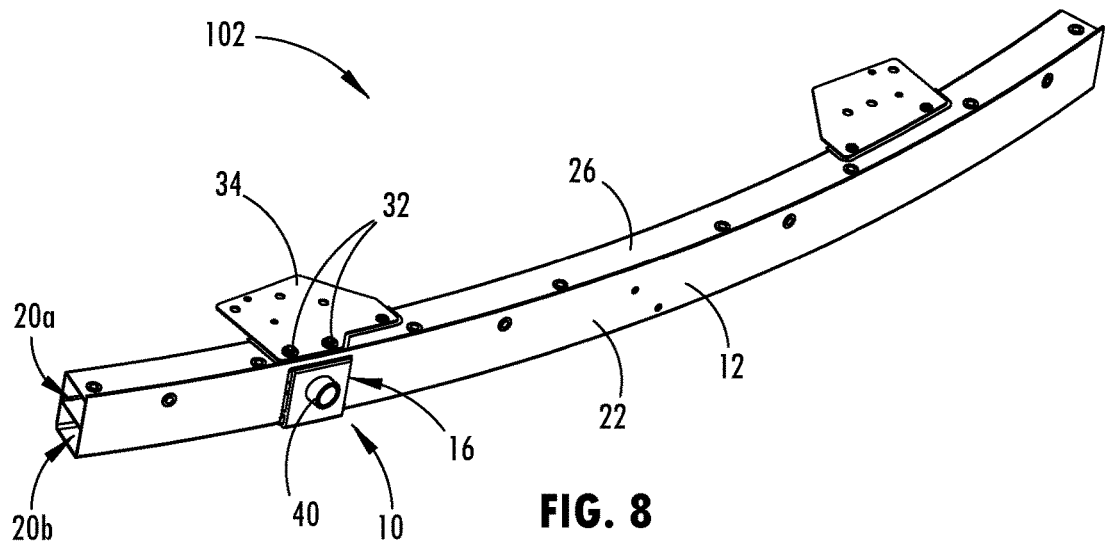
FIG. 8 is a rear, upper perspective view of the bumper assembly of FIG. 3.

The base bracket 16 may further include an external supportive portion 36 that wraps partially around the exterior of the composite vehicle beam 12, such as in the opposite direction from the portion of the base bracket 16 that is engaged by the fastener 32. The external supportive portion 36 may extend from the engagement portion 18 of the base bracket 16 and over an exterior surface of a side wall of the composite vehicle beam 12, such as the opposing side wall that is engaged by the fastener. As shown in FIG. 4, the external supportive portion 36 of the base bracket 16 extends downward and below the lower horizontal wall 30. The external supportive member 36 may then engage the supportive structure 14 of the vehicle, such as to provide an additional load path for loading forces applied to the base bracket 16. As shown in FIGS. 4 and 6, a second interface member 38 may be configured to span between the lower wall 30 of the composite vehicle beam 12 and the supportive structure 14 of the vehicle. The supportive portion 36 of the base bracket 16 may also be configured to receive a fastener or force transfer element that attaches between the external supportive portion 36 of the base bracket and the support structure 14, such as through the second interface member 38. Such a fastener may optionally extend through the lower wall of the composite vehicle beam.

The loading bracket assembly 10 may also minimize holes or openings formed in the composite structural component 12 that could jeopardize the performance of the composite structural component, such as by avoiding holes or openings or other interruptions to the tensile surfaces or walls of the composite structural component, such as the rear wall of the illustrated bumper beam 12 (FIG. 11). Also, when a fastener does extend through the composite beam 12 the opening may be "healed" to maintain the structural integrity and/or impact performance of the composite beam. Specifically, the edge surrounding the hole for the fastener may be compressed to reduce the formation and severity of stress risers at the opening, such as with the use of a rivet or a rivnut that receives a threaded fastener through the center of the rivnut. Also or alternatively, the edge may be healed with adhesive or silicon or other compounds that cure to strengthen the material surrounding the opening.

Figure 10:
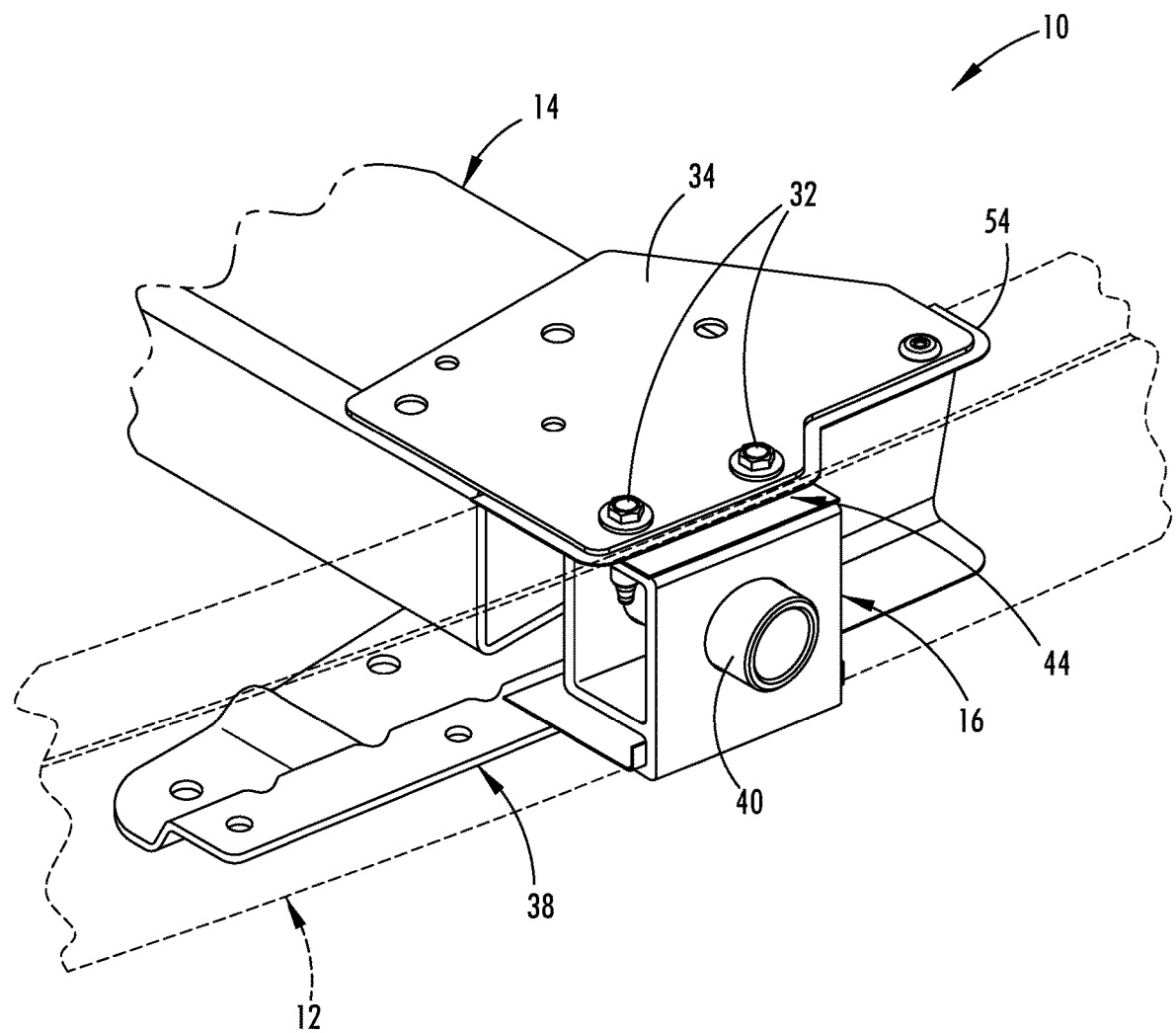
FIG. 10 is an enlarged upper perspective view of a portion of the bumper assembly shown in FIG. 8, illustrating the bumper beam in a transparent shading to show hidden portions of the bracket assembly.

The engagement portion 18 of the base bracket 16 may include an attachment feature 40 that is configured to receive a loading force that is applied to the base bracket. The attachment feature 40 of the base bracket may be configured to engage a loading accessory, such as shown in FIG. 10 where the attachment feature 40 includes a tow hook bushing that has internal threads configured to engage a tow hook. Accordingly, the loading accessory may include a tow hook that has a threaded shaft or shank portion that threadably engages the attachment feature. It is understood that the attachment feature of the base bracket may also or alternatively include other mechanical attachment configurations, adhesive, fasteners, welding, or related features to or combinations of such features.

The illustrated embodiment of the composite structural component shown in FIGS. 1-11A is provided as a bumper beam assembly 102 that has a loading bracket 16 attached to a composite bumper beam 12. The composite bumper beam 12 is attached to a supportive structure 14 of the vehicle 100, which is illustrated as supportive crush cans 14 that may be attached to the frame rail tips at the front end of the vehicle frame. It is contemplated that a variety of different supportive structures could be provided and that the bumper beam assembly could similarly be arranged at the rear end of the vehicle. The composite beam 12, such as shown in FIGS. 3-7, may have a continuous cross sectional shape (i.e. with a constant depth-width laterally from the left to right outer walls, and with a constant height from top to bottom walls). Alternatively, it is contemplated that the composite beam may be non-uniform in its width or height along its length. The illustrated composite bumper beam 12 has a longitudinally curved shape and a closed cross-sectional profile that provides a plurality of wall sections 22, 24, 26, 28, 30 surrounding at least one hollow interior area 20 and extending longitudinally along a length of the beam 12. Accordingly, the cross-sectional profile of the beam 12 may provide one or more closed or tubular portions that may share a common interior wall section 28 with an adjacent closed or tubular portion of the beam 12.

The cross-sectional profile of the beam 12, such as shown in FIG. 11, may include an upper wall section 26, an intermediate or interior wall section 28, and a lower wall section 30 that are spaced from each other to form horizontal boundaries of the hollow interior areas 20a, 20b (FIG. 4) of the bumper beam 12. The upper, intermediate, and lower wall sections 26, 28, 30 may be generally parallel with each other and have a substantially consistent wall thickness laterally across a width of the beam 12, such as shown in FIG. 11. The outer lateral walls or boundaries of the hollow interior areas 20 are enclosed by front and rear wall sections 22, 24 that integrally extend between the upper and lower wall sections 26, 30. Specifically, as shown in FIG. 4, the upper and lower ends of the rear wall section 24 integrally interconnect, respectively, with the upper and lower wall sections 26, 30 and provide curved or rounded corners. Similarly, the lower end of the front wall section 22 is shown integrally interconnecting with the lower wall section 30 at a rounded corner, while the upper end of the front wall section 22 extends past the integral connection with the upper wall section 26 to form an upward extending flange 31. The corners may also include an increased thicknesses or alternative shapes form the illustrated embodiment, such as due to overlapping pieces of fabric reinforcements that are pultruded into the beam.

As further shown in FIG. 4, the two hollow interior areas 20a, 20b of the beam 12 that are separated by the common interior wall section 28 are substantially equal in size and shape and are substantially mirror images of each other across the common interior wall section 28. In additional embodiments of the beam, more or fewer hollow interior areas may be provided, such as with symmetrical or asymmetrical configurations. The illustrated wall sections and flange of the beam 12 have generally equal thicknesses and a generally consistent thickness along a length of the beam 12, although it is understood the wall thickness may vary between wall sections and along the length of the beam in additional embodiments.

Figure 9:
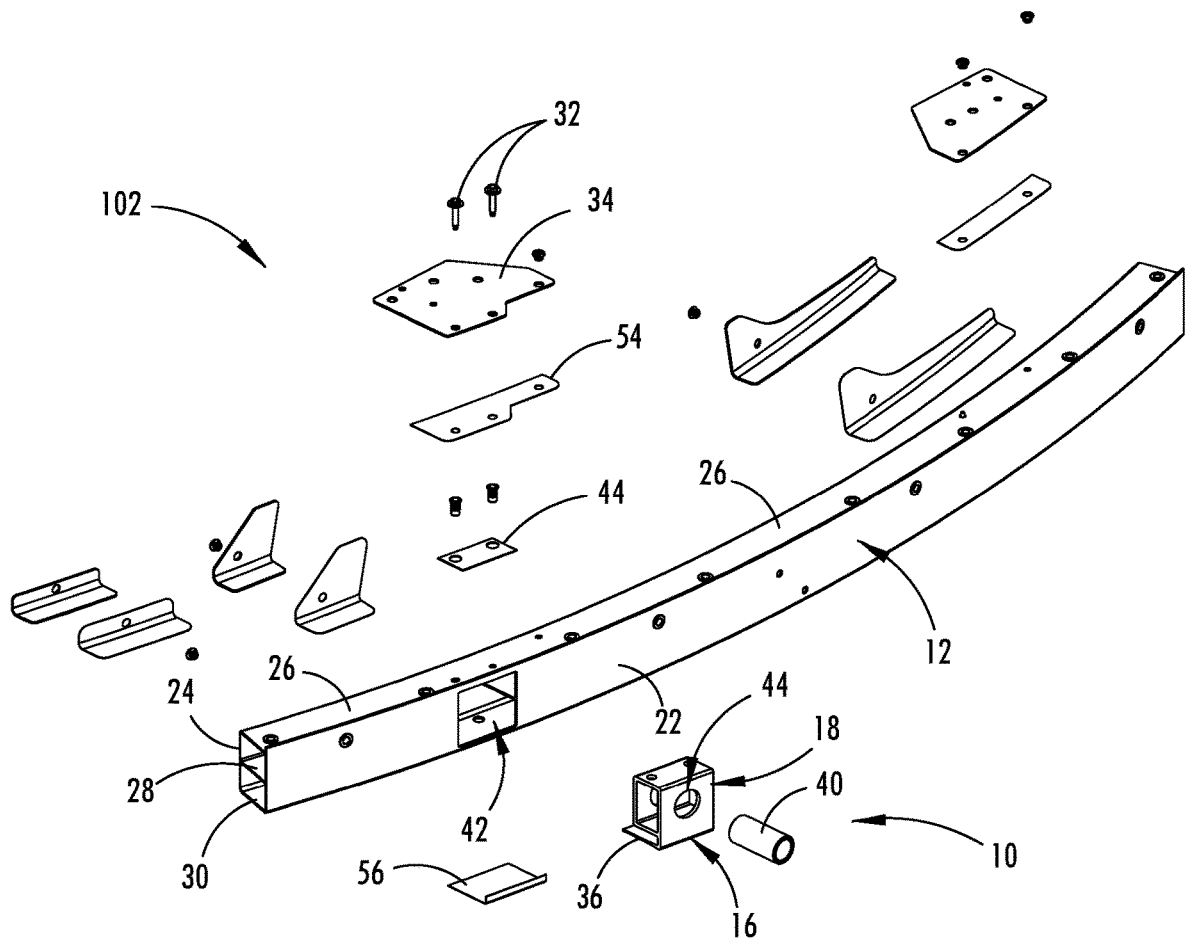
FIG. 9 is an exploded upper perspective view of the bumper assembly of FIG. 8.

As shown in FIG. 9, the beam has an opening 42 cut or otherwise formed in the front wall section 22 of the beam 12, where the opening 42 extends rearward into both upper and lower hollow interior areas 20a, 20b by the additional removal or formation of the opening 42 into the intermediate wall section 28 immediately rearward the opening 42 formed in the front wall section 22. This opening 42 does not interrupt the rear wall section 24 of the beam 12 or the upper or lower wall sections 26, 30 of the beam 12, so as to substantially maintain tensile load disbursement at least across the rear wall 24 of the beam 12. The opening 42 is sized and located for the engagement portion 18 of the loading bracket 16 to extend through the front wall 22 by being inserted into the opening 42, so as to position or dispose the loading bracket 16 within the hollow interior areas 20a, 20b of the bumper beam 12, as shown in FIG. 11. An isolator pad 44 may be disposed at an exterior surface of the engagement portion 18 of the base bracket 16. As shown in FIG. 10, the isolator pad 44 is configured to separate the engagement portion 18 of the base bracket 16 and the side wall 26 of the composite vehicle beam 12.

Figure 2:
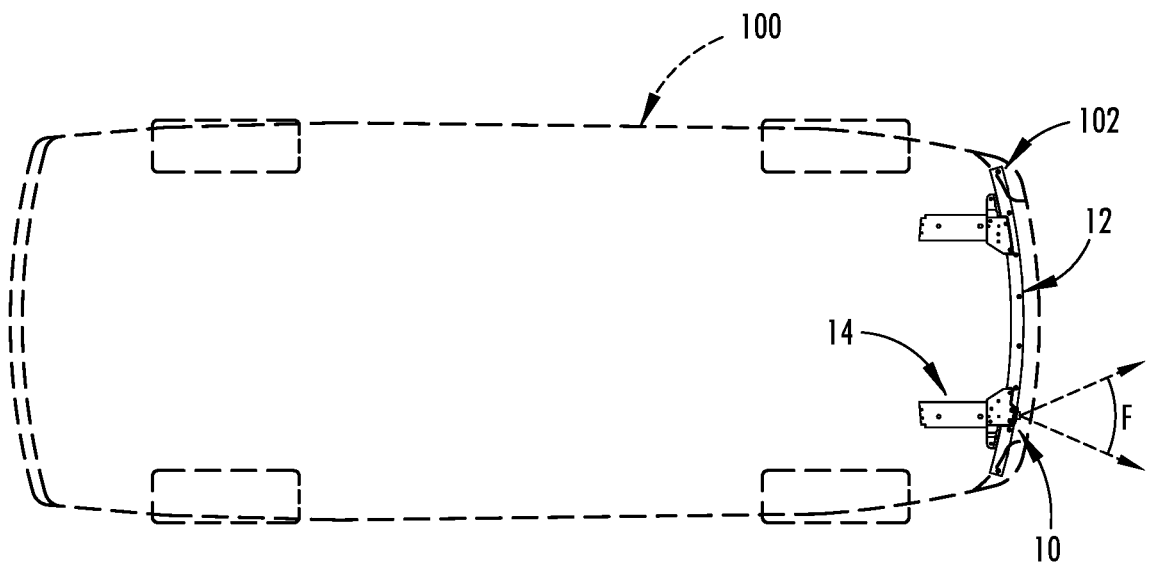
FIG. 2 is an upper plan of the vehicle shown in FIG. 1, illustrating an exemplary angular range of directional loading applied to the tow hook attachment to the loading bracket.
Figure 3:
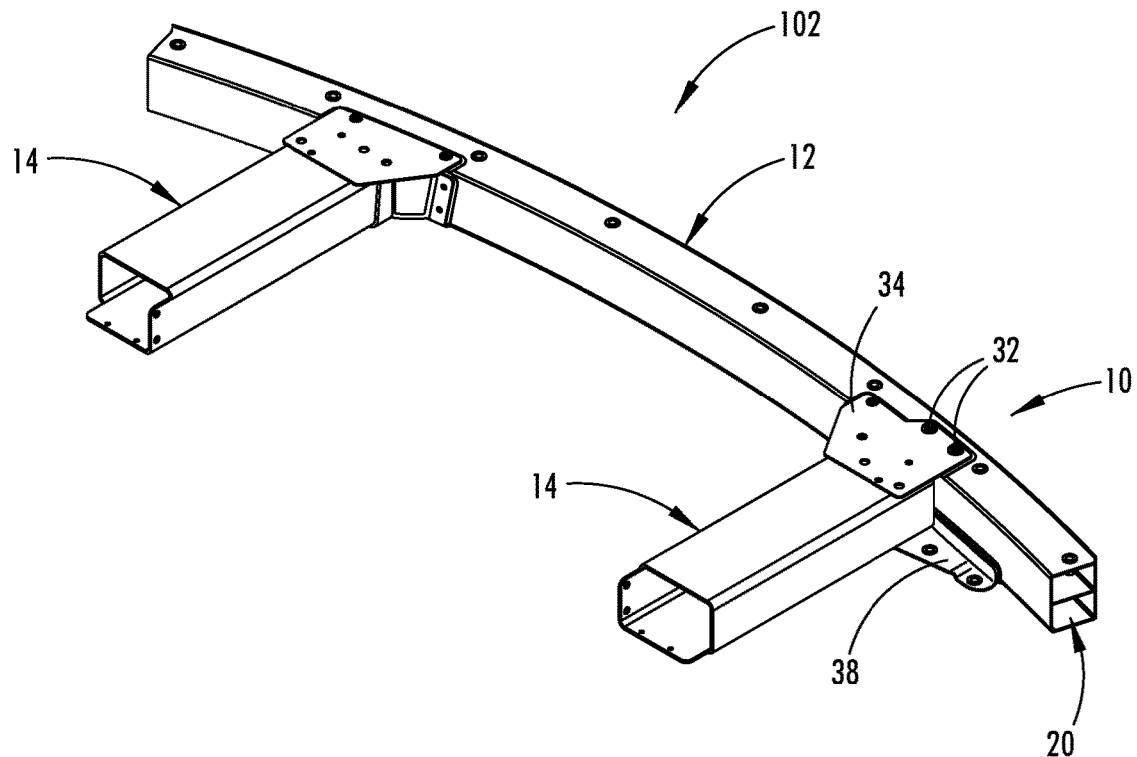
FIG. 3 is a front, upper perspective view of the bumper assembly shown in FIG. 1.

With the base bracket 16 arranged within the hollow interior areas 20a, 20b of the composite beam 12, the attachment feature 40 of the base bracket 16, which is configured to receive the loading force applied to the base bracket, is also disposed at least partially through the opening 42 and within the hollow interior areas 20a, 20b of the beam 12. The illustrated attachment feature 40 includes a cylindrical bushing that is attached through a hole 44 (FIG. 9) formed in a forward portion or forward wall section 46 of the base bracket 16 and generally arranged with an axis of the cylindrical shape of the attachment feature 40 horizontally positioned and directed longitudinally relative to the associated vehicle 100 (FIGS. 1 and 2). Such a positioning is configured for loading forces F with substantial magnitude to be applied to the base bracket in a direction within an angular range of about 20 degrees vertically (FIG. 1) and about 60 degrees laterally (FIG. 2), where such angular ranges may be roughly centered on a horizontal and longitudinally positioned line that is generally aligned with the axis of the attachment feature 40.

The engagement portion 18 of the illustrated base bracket 16 has a closed cross-sectional profile, as shown in FIG. 11, with a generally rectangular shape that is enclosed by a top wall section 48, a bottom wall section 50, a rearward wall section 52, a forward wall section 46. Thus, the isolator pad 44 is shown engaged with the top wall section 48 of the base bracket 16 and when engaged also in generally parallel alignment with the upper wall section 26 of the beam 12. The illustrated forward wall section 46 of the base bracket 16 has the hole 44 that receives the tow hook bush and is arranged forward the front wall section 22 of the beam 12. The bottom and rearward wall sections 50, 52 of the base bracket 16 are spaced away from the corresponding rear and lower wall sections 24, 30 of the beam 12.

The illustrated base bracket 16 has the external supportive portion 36 extending downward in general alignment from the forward wall section 46 of the engagement portion 18 of the base bracket 16. The external supportive portion 36 extends downward a distance that locates a rearward extending flange section of the external supportive portion 36 in general alignment with the exterior surface of the lower wall section 30 of the beam 12. As such, the illustrated external supportive portion 36 of the base bracket 16 wraps downward partially around the lower exterior area of the composite vehicle beam 12. As shown in FIG. 11, the external supportive portion 36 may engage a lower interface member 38 that connects to the crush can 14, such as with at least one fastener 39, such as a threaded bolt, that attaches between the external supportive portion 36 and the lower interface member 38, and optionally attaches through the lower wall section 30 of the beam 12, such as by engaging a rivnut disposed in the hole formed through the lower wall section of the beam. This lower fastener 39 may be provided at the time of installing the bumper assembly on the vehicle, such that it is shown in dashed lines in FIG. 11.

To separate the upper and/or lower interface members from the composite material and/or provide greater structural attachment, an adhesive 54, 56 (FIGS. 9 and 10) may be disposed at interior surfaces of the upper and/or lower interfacing members 34, 38. The adhesive may, thus, be configured to attach and/or provide a barrier between the interface member and the side wall of the composite vehicle beam 12. It is understood that the attachment of the loading bracket assembly to the pultruded beam may be done with adhesive, fasteners, brackets, or related attachment features or combinations of such attachment features that may be effective with attaching such polymeric or fiber reinforcements. It is also understood that additional embodiments of the pultruded beam may include various shapes for the desired application of the beam, such as an open profile with no enclosed or hollow areas or an alternative closed profile, which may include one or more enclosed areas that define a single tube or multi-tubular cross-sectional profile.

The base bracket may comprise a metal alloy, such as aluminum or steel, which is configured to withstand the loading forces applied to the base bracket. Accordingly, a loading force applied to the base bracket may be greater than a maximum or peak force that the composite structural component is capable of withstanding. The composite vehicle beam may comprise a polymeric material and fiber reinforcements imbedded in the polymeric material, where at least some of the fiber reinforcements may be oriented to extend longitudinally along a length of the beam, such as a result of a pultrusion process. In one form, the beam may comprise pultrudable polymeric material such as a two-part thermoset polyurethane with embedded carbon reinforcement fibers, where the two-part thermoset pulyrethane has a low viscosity prior to chemical reaction and set up, such as to provide good wet-out characteristics and reinforcement adhesion characteristics. The composite structural member may include a uniform distribution and density of reinforcement, including at least about 30% fiber volume fraction (FVF) (i.e. volume of elongated reinforcement fibers divided by total area of fibers and polymer), or more preferably about 40% to 80% FVF, and most preferably at least about 50% to 70% FVF. It is noted that the FVF can be varied at different locations within a pultruded part for optimal performance, such as by placing more or less fibers at and/or extending around corners and along walls where more (or less) stress may occur or where the stress needs to be well distributed.

The reinforcements used in the beam may include fibers arranged in various configurations, locations, and orientations, such as by using fabrics, tows, rovings, and bundles to achieve desired fiber volume densities, bending and strength properties, and crack-resisting properties. As used herein, the word "reinforcement" is intended to broadly include length-extending reinforcing fibers of all types, such as individual fibers, twisted bundles, fabrics, tows, rovings, braided fibers, fiber fabrics (including woven-flat, woven-3D, fabric with core, tailored fabric, stitched fabric, hybrid fabric with unique arrangement, or combination of fiber fabrics), and other fiber arrangements (such as intermittently placed fabric sections placed along and/or in the beam). The word "fabric" includes fibers stitched or woven or otherwise secured together to form a "sheet" or mat of fibers. The fabrics may also include unidirectional, biaxial, and triaxial composite layering configurations, among other conceivable configurations. The fibers may be of a same or similar material (such as carbon fiber), or could be a combination of different materials (such as carbon fiber and fiberglass or the like).

As noted above, it is contemplated that different polymeric and reinforcement fibers can be used depending on a particular beam's functional design requirements. For example, it is contemplated that other fibers can be used instead of carbon fibers, such as aramid, basalt, or glass fibers. Also, there are different grades and diametrical sizes of fibers (carbon and others). Also, different woven mats and different mat locations will produce different beam properties. It is contemplated that many different thermoset (or thermoplastic) materials can be used besides polyurethane. The present polyurethane is a two-part fast-curing polymer that will cure to a self-holding shape in about 5-30 seconds, though slower curing polymers can be used for optimization of the pultrusion process, such as if the pultrusion process is slowed for control reasons. It is contemplated that the reinforcement can include different types of materials, such as glass fibers in one location and carbon fibers in other (or similar) locations.

For purposes of this disclosure, the terms "upper," "lower," "right," "left," "rear," "front," "vertical," "horizontal," "inner," "outer," and derivatives thereof shall relate to the assembly as oriented in FIG. 1. However, it is to be understood that it may assume various alternative orientations, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle structural assembly comprising:
   a composite beam having at least three walls, wherein a first wall and a third wall of the composite beam extend together along opposing sides of the composite beam over at least a portion of a length of the composite beam to provide a hollow interior area therebetween, and wherein a second wall connects between the first and third walls;
   a base bracket having an engagement portion that partially extends through an opening in the first wall and is partially disposed at the hollow interior area of the composite beam;
   an interface member disposed at the second wall of the composite beam and extending over the third wall and away from the composite beam for engaging a supportive structure;
   a fastener extending through the second wall of the composite beam and attaching between the engagement portion of the base bracket and the interface member; and
   wherein the fastener and interface member are together configured to transfer a loading force applied to the engagement portion of the base bracket around the third wall of the composite beam to the supportive structure.

2. The vehicle structural assembly of claim 1, wherein the loading force applied to the base bracket is greater than a peak force that the composite beam is capable of withstanding.

3. The vehicle structural assembly of claim 1, wherein the base bracket does not interfere with the third wall of the composite beam that is substantially uninterrupted to maintain tensile load disbursement across the third wall.

4. The vehicle structural assembly of claim 1, wherein the composite beam comprises a bumper reinforcement beam of a bumper assembly, and wherein the bumper assembly is configured for a tow hook to threadably engage the engagement portion of the base bracket.

5. The vehicle structural assembly of claim 1, wherein the base bracket includes a supportive portion that extends through the opening in the first wall and over an exterior surface of the composite beam on an opposing side of the composite beam from the interface member.

6. The vehicle structural assembly of claim 5, further comprising a second interface member coupled to the supportive portion of the base bracket and configured to engage the supportive structure.

7. The vehicle structural assembly of claim 1, further comprising an isolator pad disposed between an exterior surface of the engagement portion of the base bracket and the second wall of the composite beam.

8. The vehicle structural assembly of claim 1, further comprising adhesive disposed at an interior surface of the interface member, wherein the adhesive provides a barrier between the interface member and the second wall of the composite beam.

9. The vehicle structural assembly of claim 1, wherein the composite beam comprises a polymeric material and fiber reinforcements imbedded in the polymeric material, and wherein at least some of the fiber reinforcements are oriented to extend longitudinally along the length of the composite beam.

10. The vehicle structural assembly of claim 9, wherein the composite beam includes a longitudinal curvature along the length of the composite beam.

11. The vehicle structural assembly of claim 9, wherein the composite beam comprises a bumper beam, a roof bow, a roof header, or a frame pillar.

12. A loading bracket assembly for a composite vehicle beam having a hollow interior area defined between an outer wall and an inner wall of the composite vehicle beam, said loading bracket assembly comprising:
   a base bracket having an engagement portion configured to extend through the outer wall and be disposed at the hollow interior area of the composite vehicle beam;
   an interface member configured to span between a side wall of the composite vehicle beam and a supportive structure of a vehicle;
   a fastener attached between the interface member and the engagement portion of the base bracket, wherein the fastener is configured to extend through and compress the side wall of the composite vehicle beam between the interface member and the base bracket; and
   wherein the interface member is configured to transfer a loading force applied to the base bracket around the inner wall of the composite vehicle beam to the supportive structure.

13. The loading bracket assembly of claim 12, wherein the engagement portion of the base bracket includes an attachment feature that is configured to receive the loading force, and wherein the attachment feature of the base bracket is configured to engage a loading accessory.

14. The loading bracket assembly of claim 13, wherein the attachment feature of the base bracket comprises a tow hook bushing that has internal threads, and wherein the loading accessory comprises a tow hook that threadably engages the attachment feature.

15. The loading bracket assembly of claim 12, wherein the loading force applied to the base bracket is greater than a peak force that the composite vehicle beam is capable of withstanding.

16. The loading bracket assembly of claim 12, wherein the base bracket includes a supportive portion extending from the engagement portion, and wherein the supportive portion is configured to wrap over an exterior surface of an opposing side wall of the composite vehicle beam.

17. The loading bracket assembly of claim 16, further comprising a second interface member configured to span between the opposing side wall of the composite vehicle beam and the supportive structure of the vehicle, and wherein a second fastener attaches between the second interface member and supportive portion of the base bracket.

18. The loading bracket assembly of claim 12, further comprising:
an isolator pad disposed at an exterior surface of the engagement portion of the base bracket, wherein the isolator pad is configured to separate the engagement portion of the base bracket and the side wall of the composite vehicle beam; and
an adhesive disposed at an interior surface of the interfacing member, wherein the adhesive is configured to attach and provide a barrier between the interface member and the side wall of the composite vehicle beam.

19. The loading bracket assembly of claim 12, wherein the base bracket comprises a metal alloy configured to withstand the loading forces applied to the base bracket.

20. A loading bracket assembly for a composite vehicle structural component having an interior area defined between a first wall and a third wall that are interconnected by a second wall, said loading bracket assembly comprising:
a base bracket having an engagement portion configured to be disposed at the interior area of the composite vehicle structural component and accessible through the first wall;
a fastener attached to the engagement portion of the base bracket and configured to extend through the second wall of the composite vehicle structural component and a structural member to attach the base bracket to a supportive vehicle structure; and
wherein the engagement portion is configured to engage a component or an accessory that applies a loading force to the base bracket that is substantially transferred to the supportive vehicle structure and bypasses the composite vehicle structural component.

* * * * *